(12) United States Patent
Yoneyama (10) Patent No.: US 6,487,023 B2
(45) Date of Patent: Nov. 26, 2002

(54) ZOOM LENS SYSTEM AND A ZOOM LENS BARREL THEREFOR

(75) Inventor: Shuji Yoneyama, Saitama (JP)

(73) Assignee: Asahi Kogaku Kogyo Kabushiki Kaisha, Tokyo (JP)

(*) Notice: Subject to any disclaimer, the term of this patent is extended or adjusted under 35 U.S.C. 154(b) by 52 days.

(21) Appl. No.: 09/768,404

(22) Filed: Jan. 25, 2001

(65) Prior Publication Data

US 2001/0015856 A1 Aug. 23, 2001

(30) Foreign Application Priority Data

Jan. 27, 2000 (JP) ........................................ 2000-018785

(51) Int. Cl.$^7$ .............................................. G02B 15/14
(52) U.S. Cl. ........................................ 359/687; 359/686
(58) Field of Search .................................. 359/687, 686

(56) References Cited

U.S. PATENT DOCUMENTS

| | | | |
|---|---|---|---|
| 5,699,198 A | 12/1997 | Inadome et al. | ............ 359/684 |
| 5,815,321 A | 9/1998 | Shimo | ........................ 359/687 |

FOREIGN PATENT DOCUMENTS

JP   8-248319   9/1996

Primary Examiner—Georgia Epps
Assistant Examiner—M. Hasan
(74) Attorney, Agent, or Firm—Greenblum & Bernstein, P.L.C.

(57) ABSTRACT

A zoom lens system including a positive first lens group, a negative second lens group, a positive third lens group, and a positive fourth lens group. Upon, all the lens groups move towards the object. A lens group other than the first one is a lens group for focusing, and a ratio K of traveling distance of the first to that of the second lens groups is made constant in any part of the focal length range. Furthermore, the zoom lens system satisfies the following condition:

$$0.16 < K < 0.50 \qquad (1)$$

wherein $$K = \Delta X2/\Delta X1;$$

ΔX1 and ΔX2 designate the traveling distances of the first lens group and the second lens group, from the short focal length extremity to the long focal length extremity.

9 Claims, 11 Drawing Sheets

SPHERICAL
ABERRATION

THE SINE
CONDITION

SPHERICAL
ABERRATION

CHROMATIC
ABERRATION

—— d LINE
------ g LINE
---- C LINE

LATERAL
CHROMATIC
ABERRATION

ASTIGMATISM

DISTORTION

SPHERICAL ABERRATION

THE SINE CONDITION

SPHERICAL ABERRATION

CHROMATIC ABERRATION

LATERAL CHROMATIC ABERRATION

ASTIGMATISM

DISTORTION

ZOOM LENS SYSTEM AND A ZOOM LENS BARREL THEREFOR

BACKGROUND OF THE INVENTION

1. Field of the Invention

The present invention relates to a four-lens-group zoom lens system and a zoom lens barrel thereof.

2. Description of the Related Art

As a four-lens-group zoom lens system of the prior art, the so-called "four-lens-group non-linear" zoom lens system has been known, in which ratios of traveling distances among the lens groups are varied in the focal length range defined by the short focal length extremity and the long focal length extremity. Accordingly, a four-lens-group zoom lens system of the above type is advantageous for miniaturization of the zoom lens system and for maintaining freedom on the correcting of aberrations, since each of the four lens groups moves without being influenced by the movement of other lens groups. For example, the zoom lens systems, taught in U.S. Pat. No. 5,699,198 and Japanese Unexamined Patent Publication No. Hei-8-248319, are the four-lens-group non-linear zoom lens systems, each of which includes a positive lens group, a negative lens group, a positive lens group, and a positive lens group, in this order from the object. Furthermore, upon zooming, each lens group moves independently from other lens groups (i.e., moving the four lens groups non-linearly), thereby aberrations are suitably corrected over the entire focal length range, and miniaturization of the lens system can be attained. On the other hand, in order to move each lens group non-linearly, a cam mechanism has been required. Even when one lens group out of the four lens groups is moved linearly, a cam mechanism is still required for other three lens groups.

However, a cam mechanism is structured to move cam followers in cam grooves, and the cam followers come into contact with the cam grooves in a point-contact manner. Therefore the cam mechanism tends to be deformed due to shock occurring when the cam mechanism is being operated. If a cam groove and/or a cam follower are deformed, a smooth movement of the cam mechanism cannot be maintained, and the position of the lens group is shifted according to the amount of deformation; accordingly, an in-focus state cannot be obtained. In a conventional four-lens-group non-linear zoom lens system, since at least three cam mechanisms are required, the mechanism for zooming has inevitably become complicated, thereby it is difficult to attain high precision in the operations of the zoom lens system.

SUMMARY OF THE INVENTION

It is an object of the present invention to provide a four-lens-group zoom lens system in which the zoom mechanism thereof can be simplified, and has increased precision in operations.

In order to achieve the above-mentioned object, there is provided a zoom lens system including a positive first lens group, a negative second lens group, a positive third lens group, and a positive fourth lens group, in this order from the object. Upon zooming from the short focal length extremity towards the long focal length extremity, all the lens groups move towards the object so that the distance between the first lens group and the second lens group increases, the distance between the second lens group and the third lens group decreases, and the distance between the third lens group and the fourth lens group decreases. In the zoom lens system, a lens group other than the first one is arranged to be a lens group for focusing (hereinafter, a focusing lens group), and a ratio K of traveling distance of the first lens group to that of the second lens group is made constant in any part of the focal length range defined by the short focal length extremity and the long focal length extremity. Furthermore, the zoom lens system satisfies the following condition:

$$0.16 < K < 0.50 \tag{1}$$

wherein $K = \Delta X2 / \Delta X1;$ $\Delta X1$ designates the traveling distance of the first lens group, upon zooming, from the short focal length extremity to the long focal length extremity; and $\Delta X2$ designates the traveling distance of the second lens group, upon zooming, from the short focal length extremity to the long focal length extremity.

As explained, in the case where the ratio of the traveling distance of the first lens group to that of the second lens group is made constant, the zooming mechanism can be simplified, and precision in the operations of the zoom lens system can be increased. For example, the first lens group and the second lens group can be driven by a screw mechanism. Still further, the second lens group is arranged to be a focusing lens group.

The zoom lens system according to the present invention preferably satisfies the following condition:

$$1.10 < \Delta X1/fs < 1.45 \tag{2}$$

wherein fs designates the focal length of the entire zoom lens system at the short focal length extremity.

Further, the zoom lens system according to the present invention can satisfy the following condition:

$$0.25 < fs/f1 < 0.38 \tag{3}$$

wherein f1 designates the focal length of the first lens group.

The fourth lens group includes a biconvex positive lens element and a biconcave negative lens element, in this order from the object, and preferably satisfies the following condition:

$$-0.66 < f4p/f4n < -0.35 \tag{4}$$

wherein f4p designates the focal length of the biconvex positive lens element; and f4n designates the focal length of the biconcave negative lens element.

In the above arrangement, the biconcave negative lens element can satisfy the following condition:

$$-1 < SF4n < 0 \tag{5}$$

wherein $SF4n = (r2+r1)/(r2-r1);$

SF4n designates the shape factor of the biconcave negative lens element in the fourth lens group;

r1 designates the radius of curvature of the object-side surface of the biconcave negative lens element in the fourth lens group;

r2 designates the radius of curvature of the image-side surface of the biconcave negative lens element in the fourth lens group.

The zoom lens system according to the present invention can satisfy the following condition:

$$0.82 < fs/f3 < 1.10 \qquad (6)$$

wherein f3 designates the focal length of the third lens group.

The zoom lens system according to the present invention preferably satisfies the following condition:

$$0.45 < fs/f4 < 0.56 \qquad (7)$$

wherein f4 designates the focal length of the fourth lens group.

The present invention can also be applied to a zoom lens barrel which contains a positive first lens group, a negative second lens group, a positive third lens group, and a positive fourth lens group, in this order from the object. The zoom lens barrel is arranged to move all the lens groups towards the object upon zooming from the short focal length extremity towards the long focal length extremity so that the distance between the first and the second lens groups increases, the distance between the second and the third lens groups decreases, and the distance between the third and the fourth lens groups decreases. In the zoom lens barrel, a first frame by which the first lens group is supported, and a second frame by which the second lens group is supported are moved, upon zooming, forwardly or backwardly through a linear-moving mechanism, such as screw mechanism and the like.

The linear-moving mechanism is arranged to move the first and second frames along the optical axis, with respect to a fixed frame. More concretely, in the case where a screw mechanism is employed, the screw mechanism can includes a single driving ring, helicoids respectively formed on outer and inner surfaces of the driving ring, and the corresponding helicoids respectively formed on the first and second frames, so that through the rotation of the driving ring, the first and second frames move forwardly or backwardly along the optical axis.

Instead of the above screw mechanism in which the outer-surface helicoid of the driving ring directly engages with the first-frame helicoid, and the inner-surface helicoid of the driving ring directly engage with the second-frame helicoid, another arrangement of the screw mechanism can be employed, e.g., (i) the inner-surface helicoid of the driving ring engages with a fixed frame; (ii) the driving ring and the second frame are arranged to rotate relatively, and to move together along the optical axis, and (iii) the outer-surface helicoid of the driving ring engages with the first frame. With this arrangement, if the outer-surface and inner-surface helicoids of the driving ring are formed in the same direction, the traveling distance of the first frame can be made longer.

There are various ways to non-linearly move the third lens group and the fourth lens group, with respect to the first and second lens groups which can be moved by the above-explained linear-moving mechanism. For example, the third and fourth lens groups can be arranged to non-linearly move along cam grooves which are formed on a cylindrical body which rotates in association with the driving ring or formed on the driving ring itself, while the third and fourth lens groups are linearly guided along the optical axis.

The present disclosure relates to subject matter contained in Japanese Patent Application No. 2000-018785 (filed on Jan. 27, 2000) which is expressly incorporated herein by reference in its entirety.

BRIEF DESCRIPTION OF THE DRAWINGS

The invention will be discussed below in detail with reference to the accompanying drawings, in which.

DESCRIPTION OF THE PREFERRED EMBODIMENTS

Figure 19:
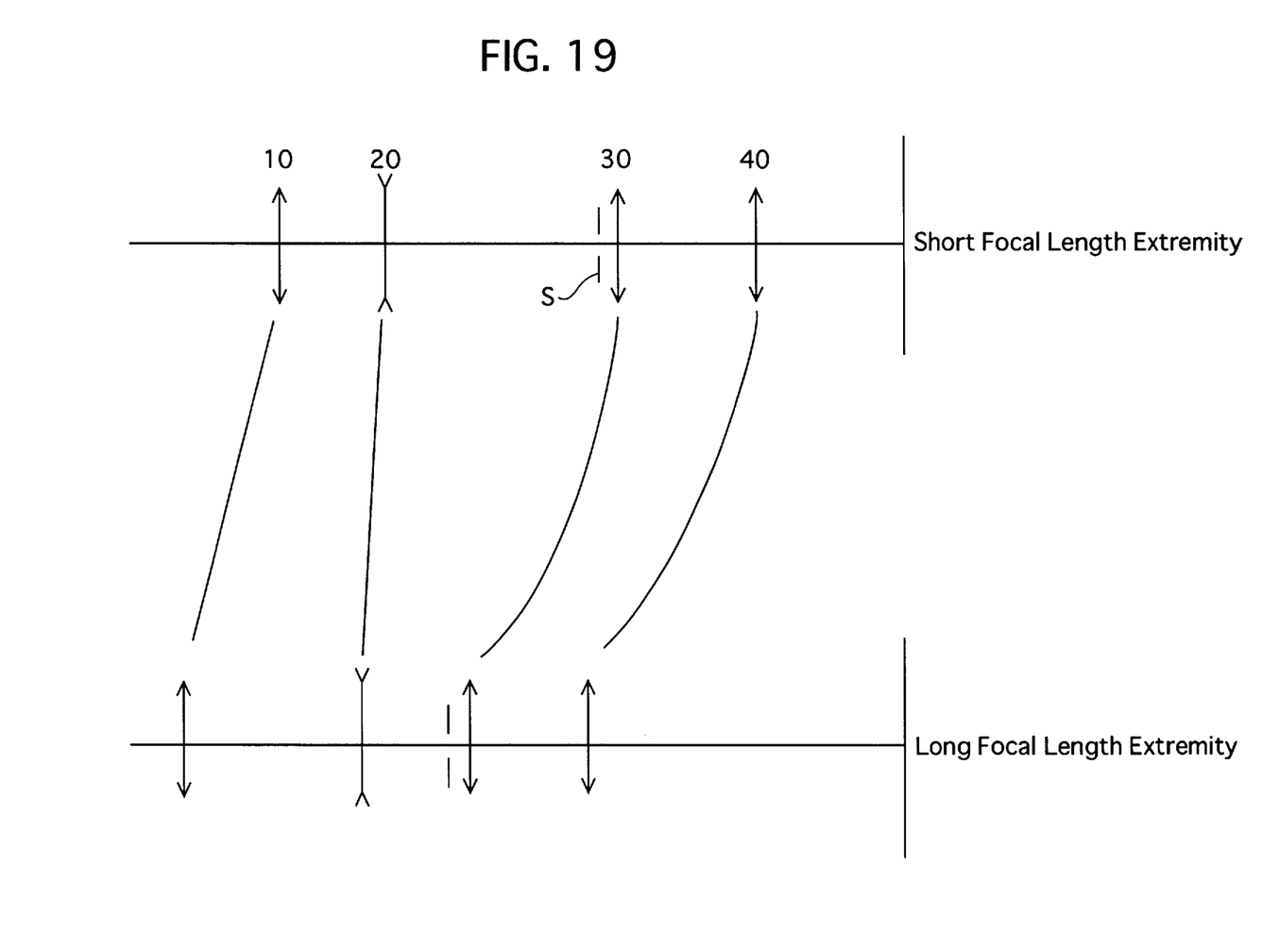
FIG. 19 is the schematic view of the lens-group moving paths for the zoom lens system according to the present invention.

The zoom lens system, as shown in FIG. 19, includes a positive first lens group 10, a negative second lens group 20, a positive third lens group 30, and a positive fourth lens group 40, in this order from the object. Upon zooming from the short focal length extremity towards the long focal length extremity, all the lens groups 10 to 40 move towards the object so that the distance between the first lens group 10 and the second lens group 20 increases, the distance between the second lens group 20 and the third lens group 30 decreases, and the distance between the third lens group 30 and the fourth lens group 40 decreases. In the zoom lens system, the first lens group 10 and the second lens group 20 are arranged to move so that the ratio of the traveling distance of the first lens group 10 to that of the second lens group 20 is made constant in any part of the focal length range defined by the short focal length extremity and the long focal length extremity. Upon focusing, the second lens group 20 is arranged to move. A aperture stop S is provided between the second lens group 20 and the third lens group 30, and moves together with the third lens group 30.

Condition (1) specifies the ratio of the traveling distance, from the short focal length extremity to the long focal length extremity upon zooming, of the first lens group 10 to that of the second lens group 20.

If K (i.e., ΔX2/ΔX1) exceeds the lower limit of condition (1), the traveling distance of the second lens group 20 becomes short. Accordingly, at the short focal length extremity, the position of the second lens group 20 has to be made closer to the object, since there is a need to secure a space for allowing the third lens group 30 to move towards the object for the purpose of maintaining an in-focus position. As a result, miniaturization at the short focal length extremity cannot be achieved.

If K (i.e., ΔX2/ΔX1) exceeds the upper limit of condition (1), the traveling distance of the second lens group 10 becomes long. Accordingly, the distance between the first lens group 10 and the second lens group 20 cannot be secured, thereby the zoom ratio becomes small. On the other hand, an attempt is made to obtain a larger zoom ratio by reducing the distance therebetween, the refractive power (hereinafter, power) of the second lens group 20 becomes too strong, so that aberrations occurred therein are large. As a result, fluctuations of aberrations occurred in the entire zoom lens system cannot be maintained small.

Condition (2) specifies the traveling distance of the first lens group 10. By satisfying condition (2) and condition (1) as well, a suitable distance can be secured between the first lens group 10 and the second lens group 20, thereby a high zoom ratio can be obtained. As a result, the overall length of the zoom lens system at the short focal length extremity can be reduced. In particular, the zoom ratio can be more than 3.

If the traveling distance of the first lens group 10 becomes short to the extent that ΔX1/fs exceeds the lower limit of condition (2), which also means that K (i.e., ΔX2/ΔX1) exceeds the upper limit of condition (1), the distance between the first lens group 10 and the second lens group 20 cannot be secured. As a result, a high zoom ratio cannot be obtained. On the other hand, if an attempt is made to obtain a higher zoom ratio by increasing the power of the second lens group 20, aberrations occurred in the entire zoom lens system become large.

If the traveling distance of the first lens group 10 becomes long to the extent that ΔX1/fs exceeds the upper limit of condition (2), the power of the second lens group 20 for zooming can be made weak, which is advantageous for the correcting of aberrations; however, the change of the length of the zoom lens system becomes too large, thereby it is difficult to constitute the lens barrel. On the other hand, if frames for supporting lens groups are coaxially arranged in the lens barrel so that each frame can be advanced or retracted with respect to other frames, enough traveling distances for the lens groups can be secured. However, clearance is required for each frame, thereby decentration inevitably becomes larger.

Condition (3) specifies the power of the first lens group 10. Conditions (1),(2) and (3) are the requirements to constitute the zoom lens system. In relation to the power of the first lens group 10, it is understood that miniaturization can be achieved by increasing the power of the first lens group 10 and increasing the magnifications of the second and subsequent lens groups, since by these optical arrangements, the traveling distance of the first lens group 10 can be reduced.

If the power of the first lens group 10 becomes strong to the extent that fs/f1 exceeds the upper limit of condition (3), spherical aberration is undercorrected at the long focal length extremity in particular. Furthermore, if the magnifications of the second and subsequent lens groups are large, aberrations occur largely, and the correcting thereof becomes difficult.

If the power of the first lens group 10 becomes weak to the extent that fs/f1 exceeds the lower limit of condition (3), the traveling distance of the first lens group 10 for zooming has be made longer, so that it becomes difficult to constitute the frames supporting the lens groups.

Condition (4) specifies the power-ratio of lens elements constituting the positive fourth lens group in the case where the fourth lens group includes a biconvex positive lens element and a biconcave negative lens element. More concretely, condition (4) specifies the ratio of the power of the biconvex positive lens element to that of the biconcave negative lens element. By satisfying this condition, the telephoto ratio (f/L; f: the focal length of the entire system; L: the length between the first surface and the image-side focal point) at the long focal length extremity can be made large, and miniaturization of the zoom lens system can be attained.

If f4p/f4n exceeds the lower limit of condition (4), the power of the biconcave negative lens element becomes too weak, thereby the second principal point of the zoom lens system is moved closer to the image plane. As a result, the telephoto ratio at the long focal length extremity decreases.

If f4p/f4n exceeds the upper limit of condition (4), the power of the biconcave negative lens element becomes strong, which is advantageous to attain miniaturization of the zoom lens system while the telephoto ratio is made higher. However, since the fourth lens group itself has the positive power, the power of the biconvex positive lens element consequently becomes strong. Therefore spherical aberration of higher order occurs, and off-axis coma largely occurs. Further, since the biconvex positive lens element and the biconcave negative lens element mutually cancel aberrations therein, sensitivity to errors in the assembly process increases.

Condition (5) specifies the configuration of one of lens elements constituting the positive fourth lens group in the case where the fourth lens group includes a biconvex positive lens element and a biconcave negative lens element. More concretely, condition (5) specifies that the radius of curvature of the object-side surface of the biconcave negative lens is larger than that of the image-side thereof. If the fourth lens group is constituted by two lens elements only, each lens element has to have strong power inevitably. In order to disperse aberrations occurred at each surface on these two lens elements, it is preferable that the positive lens element be biconvex, and the negative lens element be biconcave.

If the negative lens element is constituted by a negative meniscus lens element having the convex surface facing towards the object to the extent that SF4n exceeds the lower limit of condition (5), it is preferable to obtain a higher telephoto ratio and to attain further miniaturization; however, the occurrence of positive spherical aberration becomes insufficient, so that spherical aberration of the entire zoom lens system is uncercorrected. Still further, on the object-side surface of the negative lens element, it is preferable to form an aspherical surface on which the amount of asphericity increases towards the periphery; however, in the case where the paraxial spherical surface is a convex surface facing towards the object, if the amount of asphericity increases at the periphery, the surface thereat becomes concave, thereby an inflection point occurs on the surface shape. Accordingly, it becomes difficult to machine the lens element.

If the radius of curvature of the object-side surface convex surface of the biconcave negative lens element becomes small to the extent that SF4n exceeds the upper limit of condition (5), the telephoto ratio becomes small, thereby miniaturization of the lens system is difficult.

Condition (6) and condition (7) specify the power of the third lens group 30 and the fourth lens group 40, respectively.

If the power of the third lens group 30 becomes weak to the extent that fs/f3 exceeds the lower limit of condition (6), the third lens group 30 cannot deflect a diverging bundle of rays from the second lens group 20 at the short focal length extremity, thereby the back focal distance becomes long. Accordingly, miniaturization of the lens system cannot be attained.

If the power of the third lens group 30 becomes strong to the extent that fs/f3 exceeds the upper limit of condition (6), negative spherical aberration, in particular, becomes large, and it becomes difficult to suitably maintain aberrations in the entire zoom lens system.

If the power of the fourth lens group 40 becomes weak to the extent that fs/f4 exceeds the lower limit of condition (7), miniaturization of the zoom lens system becomes difficult.

If the power of the fourth lens group 40 becomes strong to the extent that fs/f4 exceeds the upper limit of condition (7), it is advantageous for miniaturization; however, aberrations, in particular, field curvature, become worse.

In the zoom lens system, upon zooming from the short focal length extremity to the long focal length extremity, since the ratio of the traveling distances of the first lens group 10 and the second lens group 20 is always constant, these lens groups 10 and 20 move linearly. Accordingly, it is possible to constitute the moving mechanism for the first lens group 10 and the second lens groups 20 by screw (helicoid) mechanisms, instead of cam mechanisms. Unlike the cam mechanism, the helicoid mechanism has the following advantages:
  (a) the strength of the helicoid mechanism can easily be maintained, since the flanks of the threads come into contact with each other; and
  (b) when the helicoid mechanism is mass-produced by resin molding, a product can be removed from the mold without splitting the mold.

In the case of the cam mechanism, the mold has to be splitted, and the precision of the product decreases, since the splitting lines of the mold appear on the product.

If the lens groups are designed to move linearly, it is possible to employ the cam mechanism; however, the cam mechanism cannot obtain the above advantages (a) and (b).

Figure 20:
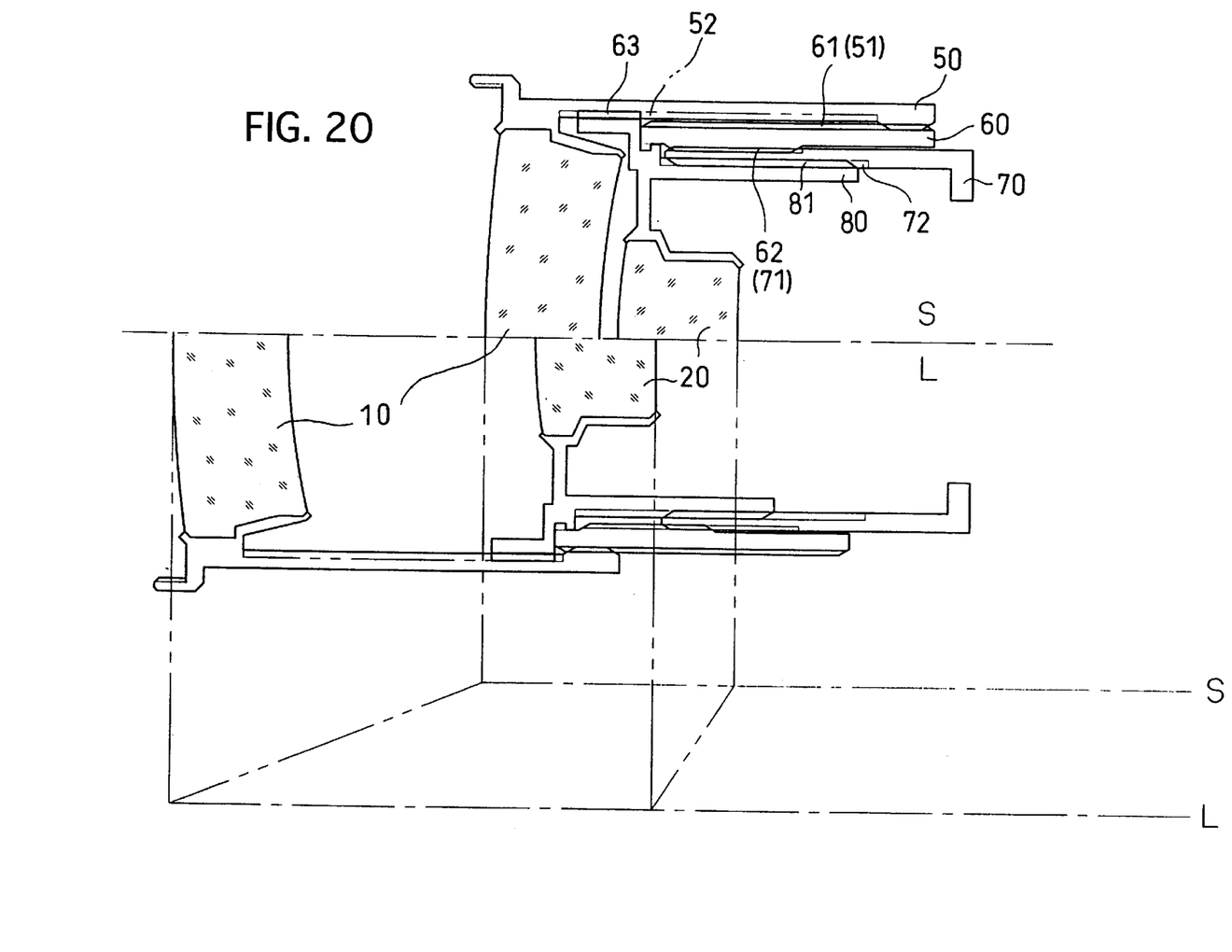
FIG. 20 shows a partial-cross sectional view of a zoom lens barrel according to the present invention.

The helicoid mechanism of the zoom lens barrel will herein be discussed. FIG. 20 shows the partial-cross sectional view of an embodiment of a zoom lens barrel which supports the zoom lens system. The upper half of FIG. 20 shows that the zoom lens system is at the short focal length extremity, and the lower half thereof shows that the zoom lens system is at the long focal length extremity. The zoom lens barrel includes a first frame 50 supporting the first lens group 10, a driving ring 60 on inner and outer surfaces of which are respectively provided with helicoids 61 and 62, a fixed frame 70 which is stationary with respect to the optical axis direction and about the optical axis, and a second frame 80 supporting the second lens group 20, in this order from the external side of the lens barrel. The helicoids 61 and 62 extend in the same direction. The driving ring 60 and the second frame 80 are engaged with each other so as to allow the relative rotation therebetween and to move together in the optical axis direction.

On the inner surface of the first frame 50, helicoid 51 which is screw-engaged with the helicoid 61, and a linear guide groove 52 which extends in a direction parallel to the optical axis, are formed. Into the linear guide groove 52, a radial projection 63 formed on the driving ring 60 engages. Furthermore, on the outer surface of the fixed frame 70, helicoid 71 which is screw-engaged with the helicoid 62 of the driving ring 60 is formed; and on the inner surface thereof, a linear guide groove 72 which extends parallel to the optical axis is formed. On the second frame 80, a radial projection 81 which engages into the linear guide groove 72 is formed.

Accordingly, the first lens group 10 and the second lens group 20 are linearly guided in the optical axis direction. When the driving ring 60 is rotated, the first frame 50 (first lens group 10) is moved in the optical axis direction in accordance with the screw-engagement with helicoids 61 and 51, while the driving ring 60 itself is being moved in the optical axis direction. Moreover, the driving ring 60, i.e., the second frame 80 (second lens group 20), is moved along the optical axis direction in accordance with the screw-engagement with helicoids 62 and 71. More concretely, since the first lens group 10 can move linearly in the optical axis direction by a distance equal to the sum of the leads of the helicoid 61 and the helicoid 62, and the second lens group 20 moves linearly in the optical axis direction in accordance with the lead of the helicoid 62. Therefor the rotational angle of the driving ring 60 and the traveling distance of the first lens group 10 maintain a linear relationship; likewise, the rotational angle of the driving ring 60 and the traveling distance of the second lens group 20 maintain the linear relationship. The leads of the helicoid 61 and the helicoid 62 are determined based on the ratio of the traveling distances of the first lens group 10 and the second lens group 20. In FIG. 20, the focusing mechanism is not shown for clarity. In the case where the second lens group 20 is utilized as a focusing lens group, the second frame 80 supports the second lens group 20 through a focusing mechanism.

Although FIG. 20 does not show zooming mechanisms for the third lens group 30 and the fourth lens group 40, cam mechanisms can be applied to these lens groups 30 and 40 in accordance with the moving paths of these lens groups. For example, predetermined moving paths for the third lens group 30 and the fourth lens group 40 can be obtained by the following arrangement:
  (i) cam grooves are formed on a cylindrical body moved in association with the driving ring 60, or on the driving ring 60 itself,
  (ii) cam followers (radial projections) formed on the third lens group 30 and the fourth lens group 40 are adapted to engage with the cam grooves, and (iii) the third lens group 30 and the fourth lens group 40 are adapted to be linearly guided.

Such a cam mechanism is well known to those skill in the art.

Specific numerical data of the embodiments will be described hereinafter. In the diagrams of the sine condition, SA represents spherical aberration, and SC represents the sine condition. In the diagrams of chromatic aberration (axial chromatic aberration) represented by spherical aberration, the solid line and the two types of dotted lines respectively indicate spherical aberrations with respect to the d, g and c lines. Also, in the diagrams of lateral chromatic aberration, the two types of dotted lines respectively indicate magnification with respect to the d, g and c lines; however, the d line as the base line coincides with the ordinates, S designates the sagittal image, and M designates the meridional image. In the tables, Fno designates the F-number, f designates the focal length of the entire lens system, W designates the half angle-of-view (°), $f_B$ designates the back focal distance, r designates the radius of curvature, d designates the lens-element thickness or distance between lens elements, Nd designates the refractive index at the d-line, and v designates the Abbe number.

In addition to the above, an aspherical surface which is symmetrical with respect to the optical axis is defined as follows:

$$x = cy^2/(1+[1-\{1+K\}c^2y^2]^{1/2}) + A4y^4 + A6y^6 + A8y^8 + A10y^{10} \ldots$$

wherein:

x designates a distance from a tangent plane of an aspherical vertex;

C designates a curvature of the aspherical vertex (1/R);

y designates a distance from the optical axis;

K designates the conic coefficient;

A4 designates a fourth—order aspherical coefficient;

A6 designates a sixth—order aspherical coefficient;

A8 designates a eighth—order aspherical coefficient; and

A10 designates a tenth—order aspherical coefficient.

[Embodiment 1]

Figure 1:
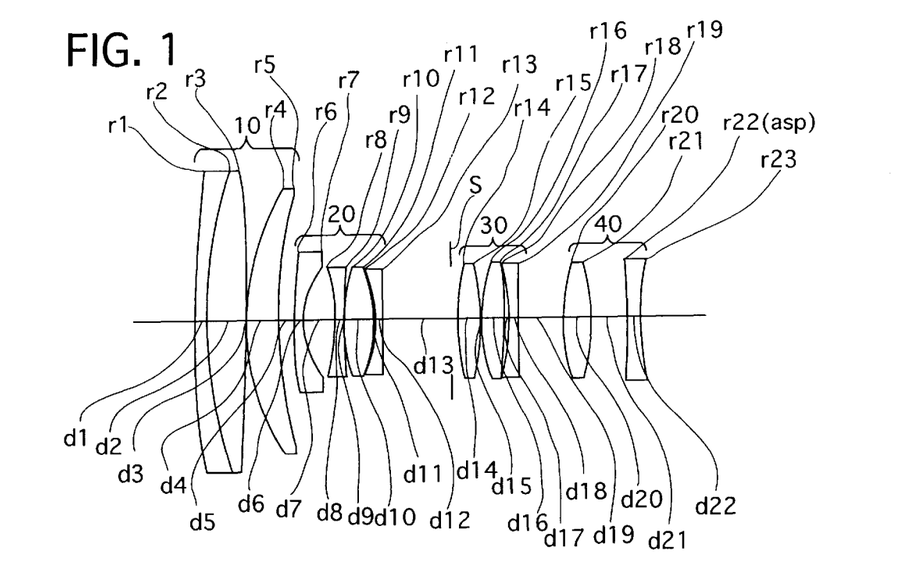
FIG. 1 is a lens arrangement, at the short focal length extremity, of a zoom lens system according to a first embodiment of the present invention.
Figure 2A:
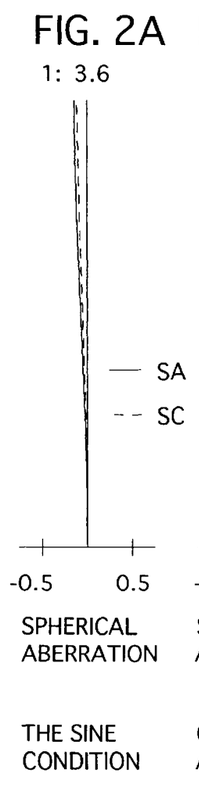
FIGS. 2A, 2B, 2C, 2D and 2E show aberrations of the lens arrangement shown in FIG. 1.
Figure 2B:
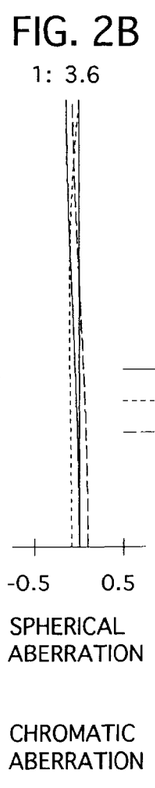
Figure 2C:
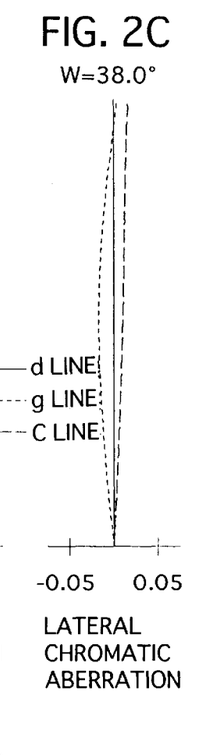
Figure 2D:
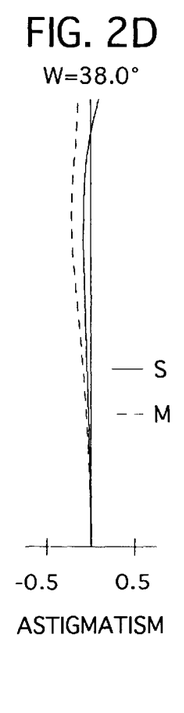
Figure 2E:
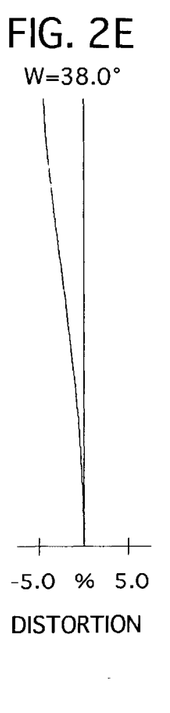
Figure 3:
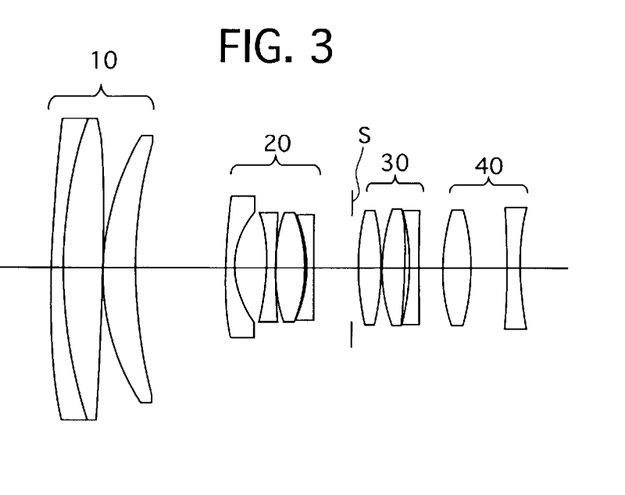
FIG. 3 is the lens arrangement, at an intermediate focal length, of the zoom lens system according to the first embodiment of the present invention.
Figure 4A:
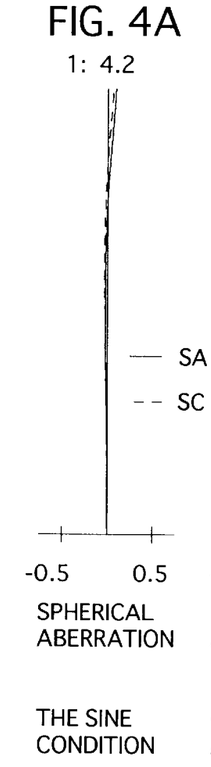
FIGS. 4A, 4B, 4C, 4D and 4E show aberrations of the lens arrangement shown in FIG. 3.
Figure 4B:
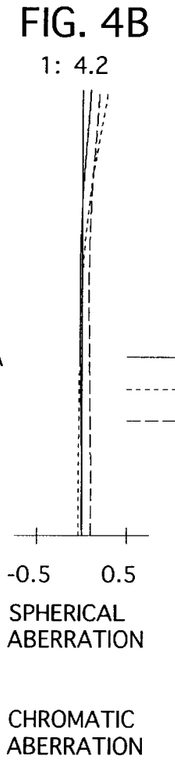
Figure 4C:
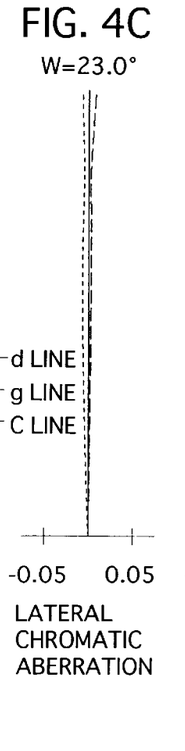
Figure 4D:
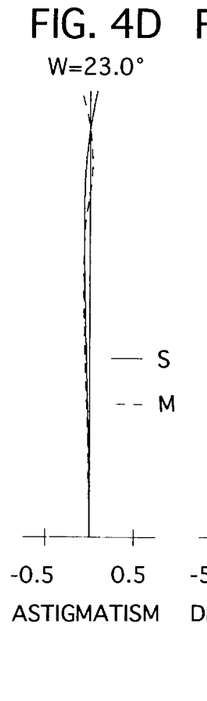
Figure 4E:
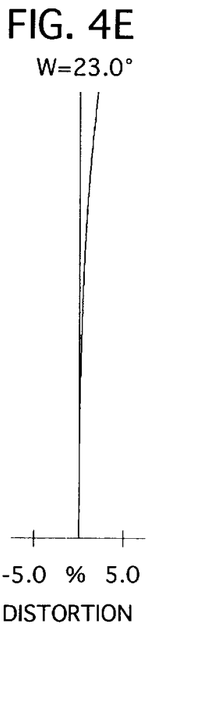
Figure 5:
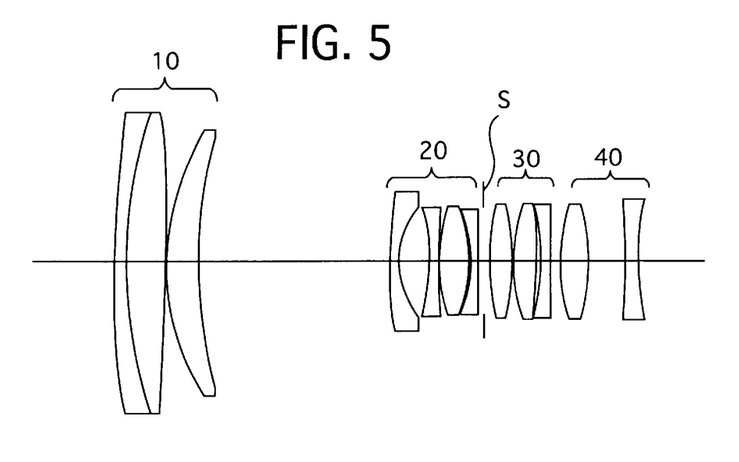
FIG. 5 is the lens arrangement, at the long focal length extremity, of the zoom lens system according to the first embodiment of the present invention.
Figure 6A:
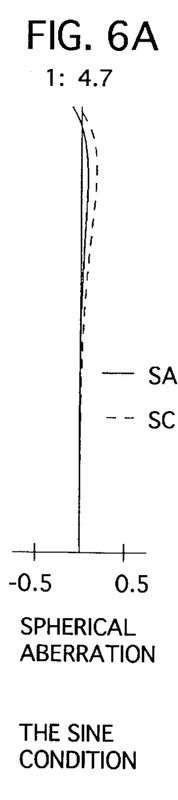
FIGS. 6A, 6B, 6C, 6D and 6E show aberrations of the lens arrangement shown in FIG. 5.
Figures 6B, 6C:
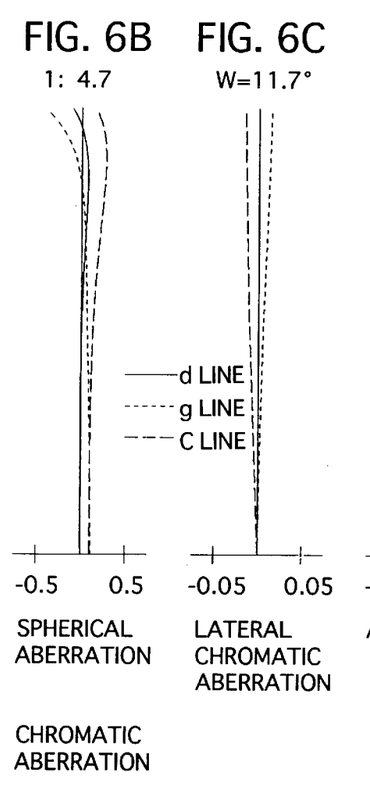
Figure 6D:
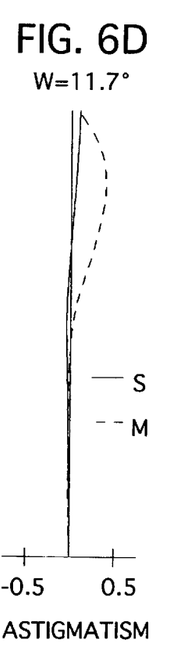
Figure 6E:
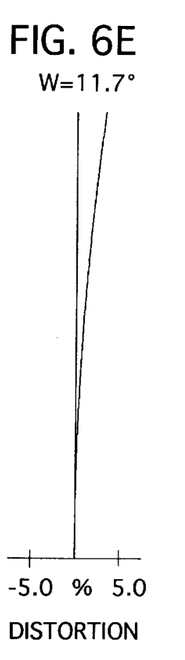

FIGS. 1 through 6E show the first embodiment of the zoom lens system. FIG. 1 is the lens arrangement at the short focal length extremity, FIG. 3 is the lens arrangement at an intermediate focal length, and FIG. 5 is the lens arrangement at the long focal length extremity. FIGS. 2A through 2E, FIGS. 4A through 4E, and FIGS. 6A through 6E show aberrations of the lens arrangements shown in FIGS. 1, 3 and 5, respectively. Table 1 shows the numerical data of the first embodiment. The first lens group 10 (surface Nos. 1–5) includes cemented lens elements constituted by a negative lens element and a positive lens element, and a positive lens element, in this order from the object. The second lens group 20 (surface Nos. 6–13) includes a negative lens element, a negative lens element, a positive lens element, and a negative lens element, in this order from the object. The third lens group 30 (surface Nos. 14–19) includes a positive lens element, a positive lens element, and a negative lens element, in this order from the object. The fourth lens group 40 (surface Nos. 20–23) includes a biconvex positive lens element and a biconcave negative lens element. The symbol "asp" indicating the surface No. 22 designates an aspherical surface.

TABLE 1

$F_{NO}$ = 1:3.6-4.2-4.7
f = 29.00-50.00-101.28 (zoom ratio: 3.49)
W = 38.0-23.0-11.7
$f_B$ = 38.00-50.03-62.08

| Surface No. | r | d | Nd | v |
|---|---|---|---|---|
| 1 | 185.763 | 1.80 | 1.84666 | 23.8 |
| 2 | 74.251 | 6.16 | 1.60311 | 60.7 |
| 3 | −392.483 | 0.10 | — | — |
| 4 | 39.284 | 5.15 | 1.69680 | 55.5 |
| 5 | 82.396 | 2.40–14.05–30.19 | — | — |
| 6 | 79.187 | 1.50 | 1.83481 | 42.7 |
| 7 | 13.390 | 5.01 | — | — |
| 8 | −27.945 | 1.30 | 1.80400 | 46.6 |
| 9 | 112.643 | 0.10 | — | — |
| 10 | 30.166 | 4.53 | 1.78472 | 25.7 |
| 11 | −24.553 | 0.28 | — | — |
| 12 | −21.754 | 1.30 | 1.80400 | 46.6 |
| 13 | 400.451 | 10.97–5.98–1.19 | — | — |
| Aperture stop | ∞ | 1.00 | — | — |
| 14 | 46.313 | 3.43 | 1.51633 | 64.1 |
| 15 | −46.313 | 0.10 | — | — |
| 16 | 26.648 | 3.74 | 1.62280 | 57.0 |
| 17 | −97.031 | 0.85 | — | — |
| 18 | −34.986 | 1.50 | 1.84666 | 23.8 |
| 19 | 623.265 | 7.14–3.72–1.47 | — | — |
| 20 | 31.823 | 4.40 | 1.48749 | 70.2 |
| 21 | −31.823 | 5.68 | — | — |
| 22* | −1000.000 | 2.00 | 1.63930 | 44.9 |
| 23 | 42.561 | — | — | — |

*designates the aspherical surface which is rotationally symmetrical with respect to the optical axis.

Aspherical surface data (the aspherical surface coefficients not indicated are zero (0.00)):

| Surface No. | K | A4 | A6 | A8 |
|---|---|---|---|---|
| 22 | −1.00 | −0.4869 × 10$^{-4}$ | −0.9213 × 10$^{-7}$ | −0.2980 × 10$^{-9}$ |

[Embodiment 2]

Figure 7:
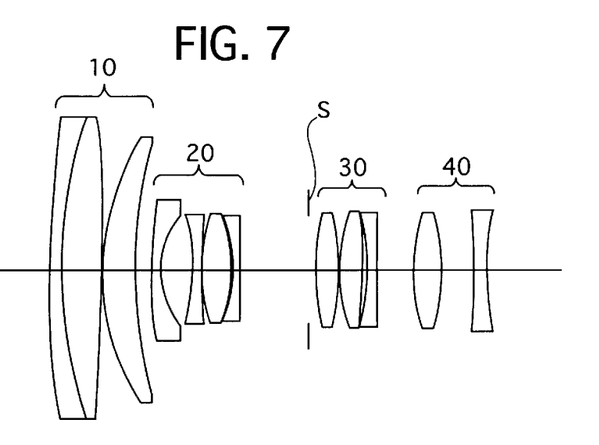
FIG. 7 is a lens arrangement, at the short focal length extremity, of a zoom lens system according to a second embodiment of the present invention.
Figure 8A:
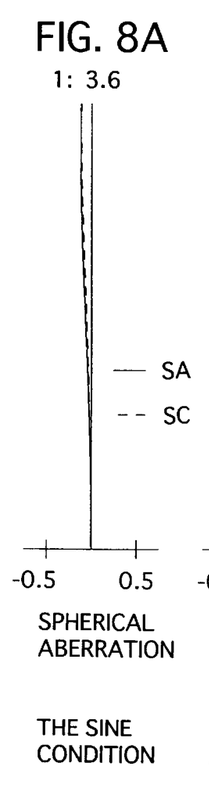
FIGS. 8A, 8B, 8C, 8D and 8E show aberrations of the lens arrangement shown in FIG. 7.
Figures 8B, 8C:
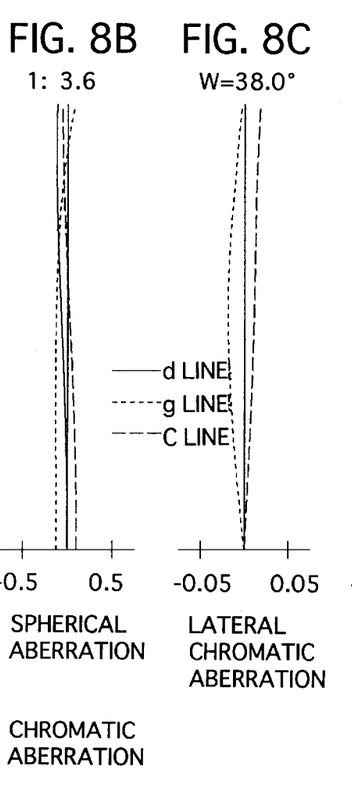
Figure 8D:
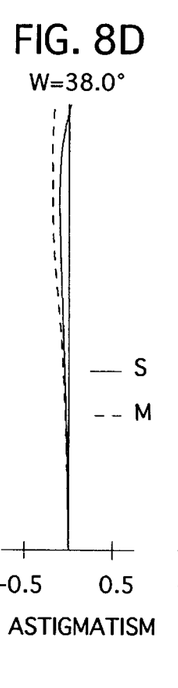
Figure 8E:
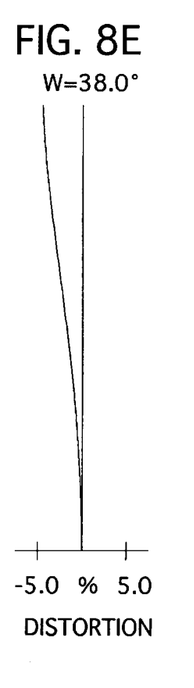
Figure 9:
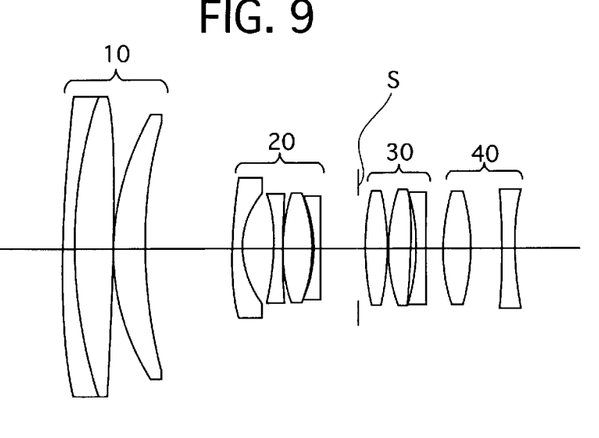
FIG. 9 is the lens arrangement, at an intermediate focal length, of the zoom lens system according to the second embodiment of the present invention.
Figure 10A:
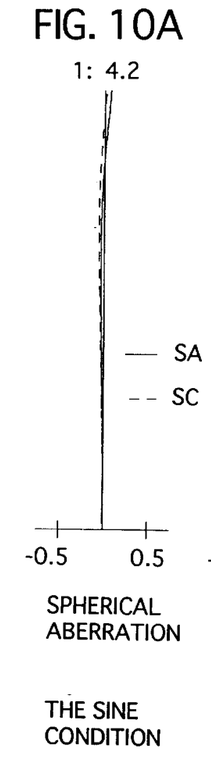
FIGS. 10A, 10B, 10C, 10D and 10E show aberrations of the lens arrangement shown in FIG. 9.
Figures 10B, 10C:
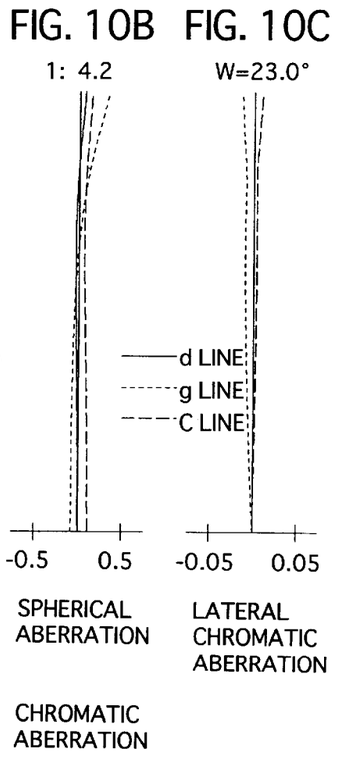
Figure 10D:
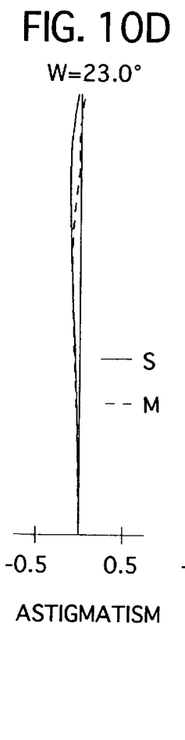
Figure 10E:
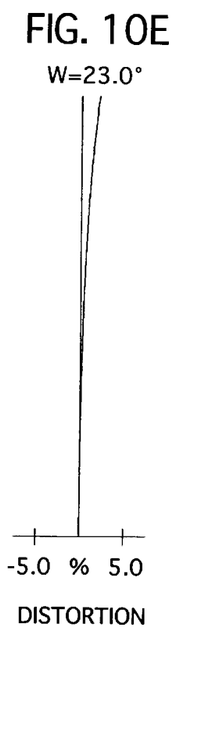
Figure 11:
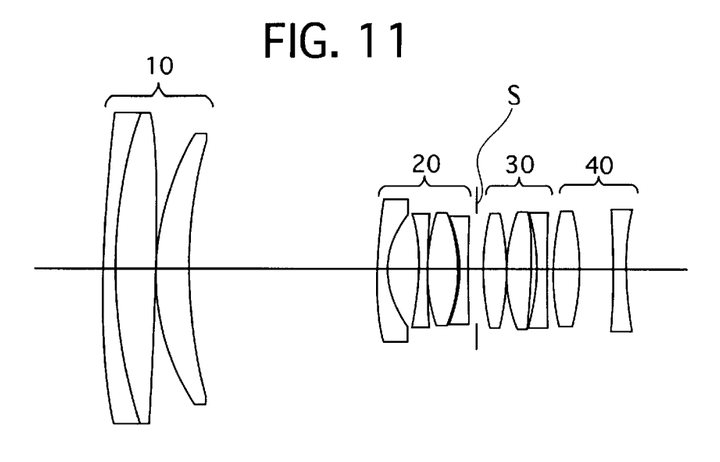
FIG. 11 is the lens arrangement, at the long focal length extremity, of the zoom lens system according to the second embodiment of the present invention.
Figure 12A:
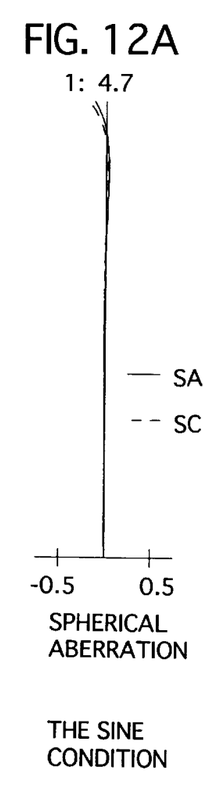
FIGS. 12A, 12B, 12C, 12D and 12E show aberrations of the lens arrangement shown in FIG. 11.
Figure 12B:
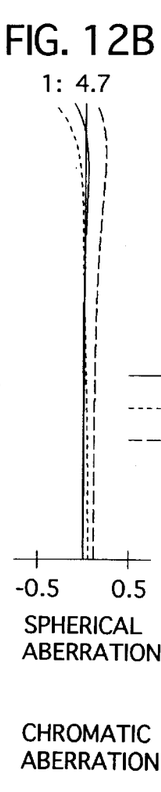
Figure 12C:
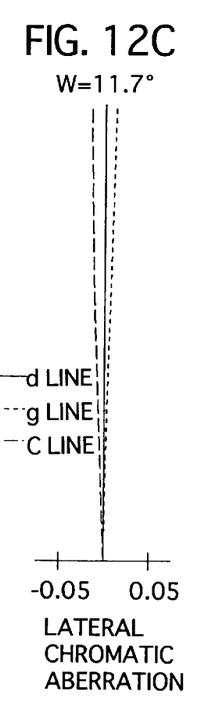
Figure 12D:
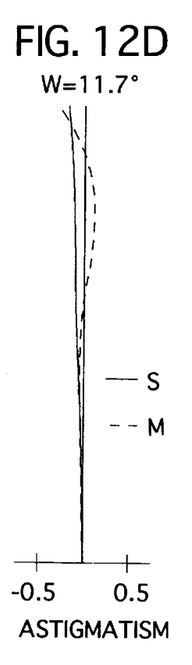
Figure 12E:
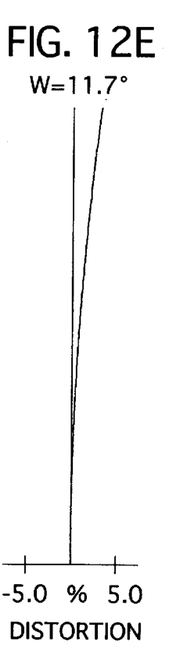

FIGS. 7 through 12E show the second embodiment of the zoom lens system. FIG. 7 is the lens arrangement at the short focal length extremity, FIG. 9 is the lens arrangement at an intermediate focal length, and FIG. 11 is the lens arrangement at the long focal length extremity. FIGS. 8A through 8E, FIGS. 10A through 10E, and FIGS. 12A through 12E show aberrations of the lens arrangements shown in FIGS. 7, 9 and 11, respectively. Table 2 shows the numerical data of the second embodiment. The basic lens arrangement is the same as the first embodiment.

TABLE 2

$F_{NO}$ = 1:3.6-4.2-4.7
f = 29.00-50.00-101.28 (zoom ratio: 3.49)
W = 38.0-23.0-11.7
$f_B$ = 39.50-51.49-64.08

| Surface No. | r | d | Nd | v |
|---|---|---|---|---|
| 1 | 181.068 | 1.80 | 1.84666 | 23.8 |
| 2 | 73.440 | 6.24 | 1.60311 | 60.7 |
| 3 | −433.656 | 0.10 | — | — |
| 4 | 39.851 | 5.24 | 1.69680 | 55.5 |
| 5 | 89.403 | 2.17–13.72–29.34 | — | — |
| 6 | 69.608 | 1.50 | 1.83481 | 42.7 |
| 7 | 13.032 | 5.13 | — | — |
| 8 | −27.206 | 1.30 | 1.80400 | 46.6 |
| 9 | 158.134 | 0.10 | — | — |
| 10 | 29.311 | 4.44 | 1.78472 | 25.7 |
| 11 | −26.184 | 0.31 | — | — |
| 12 | −22.684 | 1.30 | 1.80400 | 46.6 |
| 13 | 244.295 | 11.31–6.22–1.23 | — | — |

TABLE 2-continued

| | | | | |
|---|---|---|---|---|
| Aperture stop | ∞ | 1.00 | — | — |
| 14 | 43.881 | 3.50 | 1.51633 | 64.1 |
| 15 | -43.881 | 0.10 | — | — |
| 16 | 24.503 | 3.67 | 1.62280 | 57.0 |
| 17 | -175.614 | 1.11 | — | — |
| 18 | -33.785 | 1.50 | 1.84666 | 23.8 |
| 19 | 1708.459 | 5.97-2.99-1.12 | — | — |
| 20 | 47.770 | 4.17 | 1.48749 | 70.2 |
| 21 | -26.961 | 4.95 | — | — |
| 22* | -1000.000 | 2.00 | 1.63930 | 44.9 |
| 23 | 51.517 | — | — | — |

*designates the aspherical surface which is rotationally symmetrical with respect to the optical axis.

Aspherical surface data (the aspherical surface coefficients not indicated are zero (0.00)):

| Surface No. | K | A4 | A6 | A8 |
|---|---|---|---|---|
| 22 | -1.00 | $-0.4473 \times 10^{-4}$ | $-0.7789 \times 10^{-7}$ | $-0.4705 \times 10^{-9}$ |

[Embodiment 3]

Figure 13:
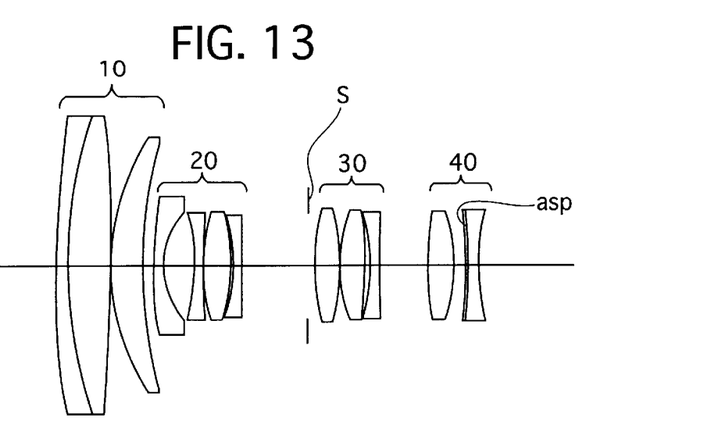
FIG. 13 is a lens arrangement, at the short focal length extremity, of a zoom lens system according to a third embodiment of the present invention.
Figure 14A:
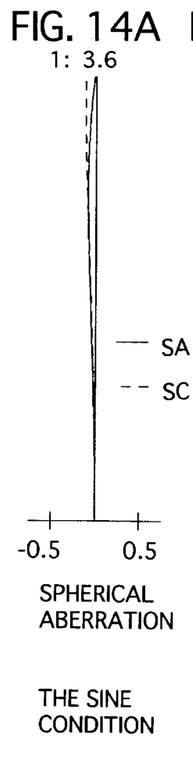
FIGS. 14A, 14B, 14C, 14D and 14E show aberrations of the lens arrangement shown in FIG. 13.
Figure 14B:
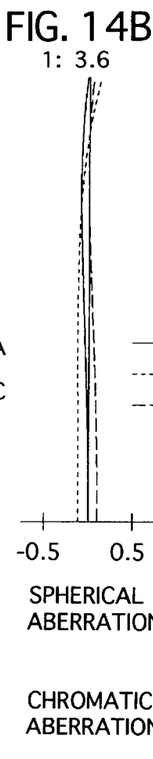
Figure 14C:
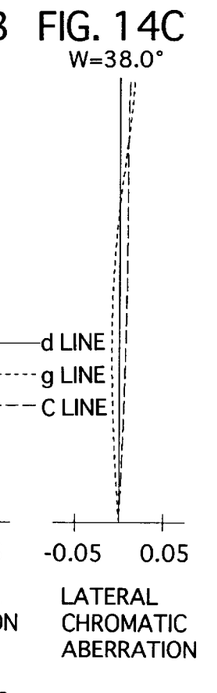
Figure 14D:
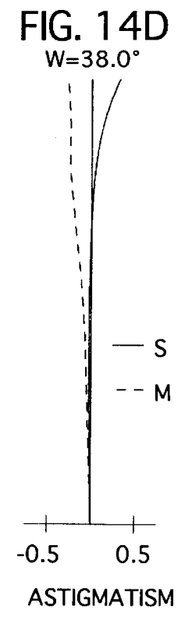
Figure 14E:
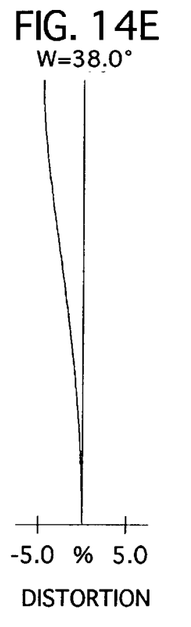
Figure 15:
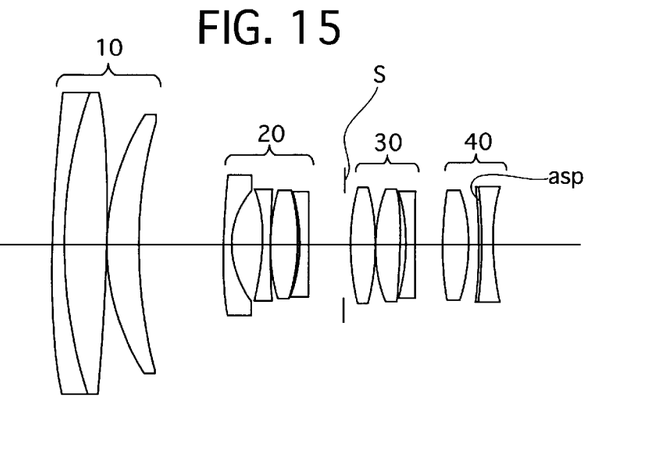
FIG. 15 is the lens arrangement, at an intermediate focal length, of the zoom lens system according to the third embodiment of the present invention.
Figure 16A:
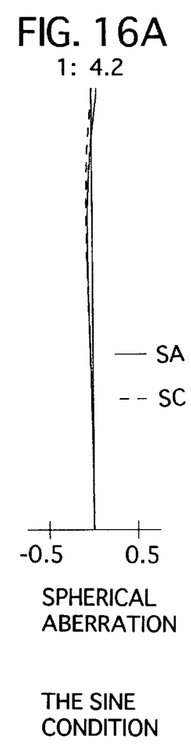
FIGS. 16A, 16B, 16C, 16D and 16E show aberrations of the lens arrangement shown in FIG. 15.
Figure 16B:
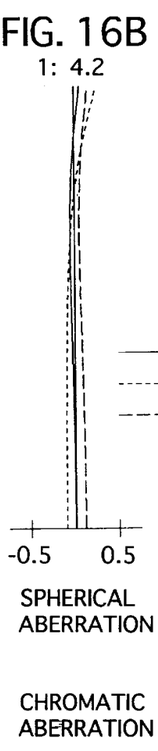
Figure 16C:
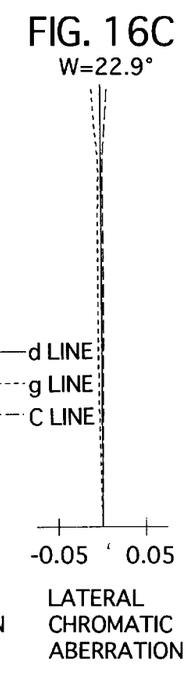
Figure 16D:
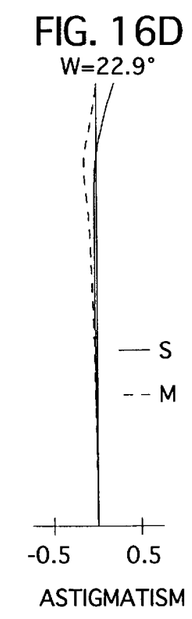
Figure 16E:
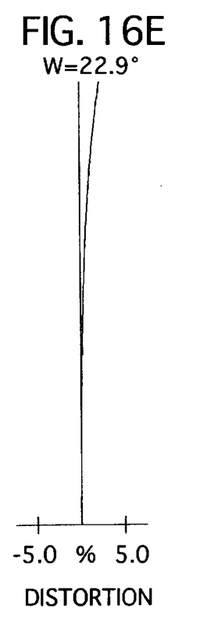
Figure 17:
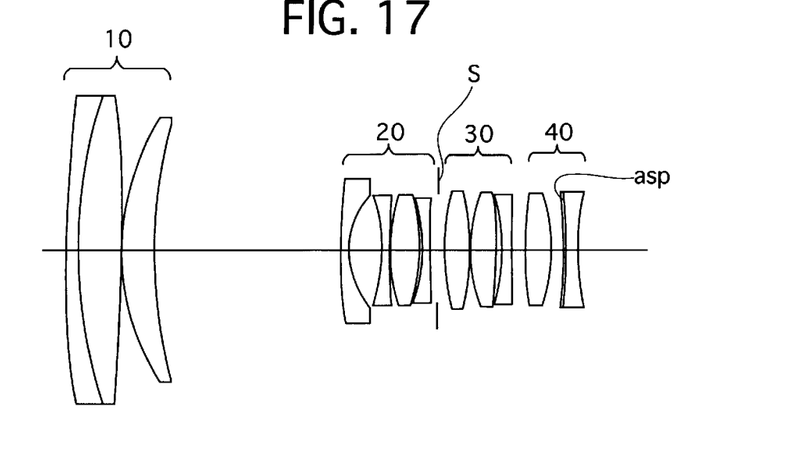
FIG. 17 is the lens arrangement, at the long focal length extremity, of the zoom lens system according to the third embodiment of the present invention.
Figure 18A:
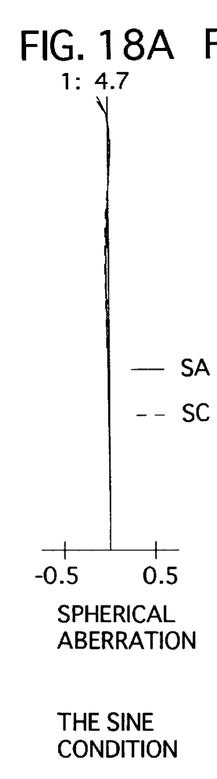
FIGS. 18A, 18B, 18C, 18D and 18E show aberrations of the lens arrangement shown in FIG. 17.
Figures 18B, 18C:
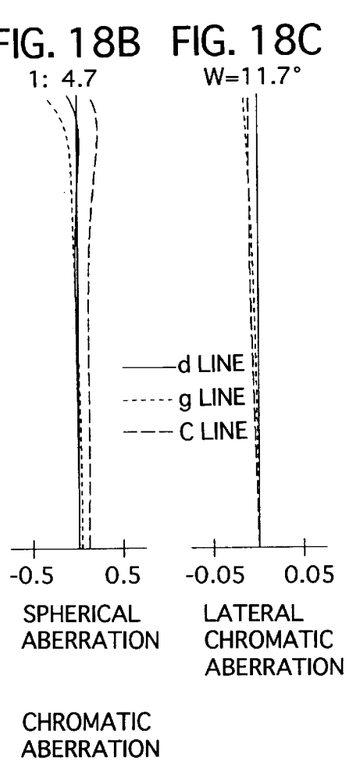
Figure 18D:
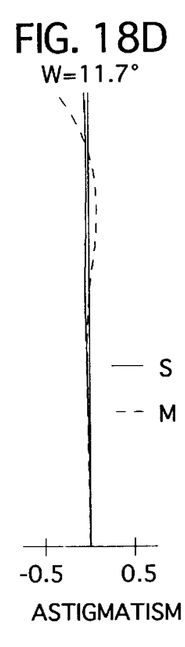
Figure 18E:
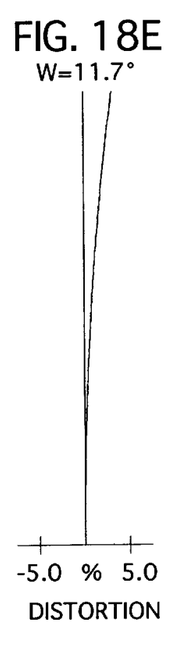

FIGS. 13 through 18E show the third embodiment of the zoom lens system. FIG. 13 is the lens arrangement at the short focal length extremity, FIG. 15 is the lens arrangement at an intermediate focal length, and FIG. 17 is the lens arrangement at the long focal length extremity. FIGS. 14A through 14E, FIGS. 16A through 16E, and FIGS. 18A through 18E show aberrations of the lens arrangements shown in FIGS. 13, 15 and 17, respectively. Table 3 shows the numerical data of the third embodiment. The basic lens arrangement is the same as the first embodiment. Note that the object-side aspherical surface of the biconcave negative lens element of the fourth lens group 40 is formed by the aspherical-machining process.

TABLE 3

$F_{NO} = 1:3.6-4.2-4.7$
f = 29.00-50.00-101.29 (zoom ratio: 3.49)
W = 38.0-22.9-11.7
$f_B$ = 39.50-52.30-65.42

| Surface No. | r | d | Nd | ν |
|---|---|---|---|---|
| 1 | 180.202 | 1.80 | 1.84666 | 23.8 |
| 2 | 69.824 | 6.91 | 1.60311 | 60.7 |
| 3 | -238.042 | 0.10 | — | — |
| 4 | 37.783 | 4.81 | 1.69680 | 55.5 |
| 5 | 69.749 | 1.94-13.38-29.12 | — | — |
| 6 | 74.320 | 1.50 | 1.83481 | 42.7 |
| 7 | 13.351 | 5.04 | — | — |
| 8 | -26.040 | 1.30 | 1.80400 | 46.6 |
| 9 | 128.299 | 0.10 | — | — |
| 10 | 31.610 | 4.20 | 1.84666 | 23.8 |
| 11 | -31.610 | 0.49 | — | — |
| 12 | -23.568 | 1.30 | 1.80400 | 46.6 |
| 13 | 886.000 | 10.78-5.84-1.14 | — | — |
| Aperture stop | ∞ | 1.00 | — | — |
| 14 | 32.400 | 3.94 | 1.69680 | 55.5 |
| 15 | -42.907 | 0.10 | — | — |
| 16 | 27.560 | 3.90 | 1.48749 | 70.2 |
| 17 | -82.030 | 1.07 | — | — |
| 18 | -26.589 | 1.50 | 1.84666 | 23.8 |
| 19 | 4861.178 | 7.64-4.36-2.25 | — | — |
| 20 | 53.834 | 4.09 | 1.58913 | 61.2 |
| 21 | -23.825 | 1.66 | — | — |
| 22* | -303.030 | 0.30 | 1.52700 | 43.2 |
| 23 | -76.269 | 2.00 | 1.77250 | 49.6 |
| 24 | 47.073 | — | — | — |

*designates the aspherical surface which is rotationally symmetrical with respect to the optical axis.

Aspherical surface data (the aspherical surface coefficients not indicated are zero (0.00)):

| Surface No. | K | A4 | A6 | A8 |
|---|---|---|---|---|
| 22 | -1.00 | $-0.5796 \times 10^{-4}$ | $-0.9589 \times 10^{-7}$ | $-0.5673 \times 10^{-9}$ |

Table 4 shows the numerical values of each condition of each embodiment.

| | Embod. 1 | Embod. 2 | Embod. 3 |
|---|---|---|---|
| Condition (1) | 0.237 | 0.256 | 0.286 |
| Condition (2) | 1.256 | 1.259 | 1.312 |
| Condition (3) | 0.363 | 0.372 | 0.369 |
| Condition (4) | -0.532 | -0.470 | -0.614 |
| Condition (5) | -0.918 | -0.902 | -0.731 |
| Condition (6) | 0.848 | 0.880 | 1.005 |
| Condition (7) | 0.528 | 0.502 | 0.468 |

As can be understood from Table 4, each embodiment satisfies each condition. Furthermore, according to the various aberration diagrams in each embodiment, aberrations are adequately corrected.

According to the above description, a four-lens-group zoom lens system, in which the zoom mechanism thereof can be simplified, and has increased precision in operations, can be obtained.

What is claimed is:

1. A zoom lens system comprising a positive first lens group, a negative second lens group, a positive third lens group, and a positive fourth lens group, in this order from an object;

wherein upon zooming from the short focal length extremity towards the long focal length extremity, all of said lens groups move towards said object so that the distance between said first lens group and said second lens group increases, the distance between said second lens group and said third lens group decreases, and the distance between said third lens group and said fourth lens group decreases;

wherein a lens group other than said first lens group comprises a lens group for focusing;

wherein a ratio K of traveling distance of said first lens group to that of said second lens group is made constant in any part of the focal length range defined by the short focal length extremity and the long focal length extremity; and wherein said zoom lens system satisfies the following condition:

0.16<K<0.50 wherein

K=ΔX2/ΔX1;

ΔX1 designates the traveling distance of said first lens group, upon zooming, from the short focal length extremity to the long focal length extremity; and ΔX2 designates the traveling distance of said second lens group, upon zooming, from the short focal length extremity to the long focal length extremity.

2. The zoom lens system according to claim 1, wherein said second lens group comprises a focusing lens group.

3. The zoom lens system according to claim 1, satisfies the following condition:

$$1.10 < \Delta X1/fs < 1.45$$

wherein fs designates the focal length of the entire zoom lens system at the short focal length extremity.

4. The zoom lens system according to claim 1, satisfies the following condition:

$$0.25 < fs/f1 < 0.38$$

wherein f1 designates the focal length of said first lens group.

5. The zoom lens system according to claim 1, wherein said fourth lens group comprises a biconvex positive lens element and a biconcave negative lens element, in this order from said object, and satisfies the following condition:

$$-0.66 < f4p/f4n < -0.35$$

wherein f4p designates the focal length of said biconvex positive lens element; and f4n designates the focal length of said biconcave negative lens element.

6. The zoom lens system according to claim 5, wherein said biconcave negative lens element satisfies the following condition:

$$-1 < SF4n < 0$$

wherein $$SF4n = (r2+r1)/(r2-r1);$$

SF4n designates the shape factor of the biconcave negative lens element;

r1 designates the radius of curvature of the object-side surface of said biconcave negative lens element;

r2 designates the radius of curvature of the image-side surface of said biconcave negative lens element.

7. The zoom lens system according to claim 1, satisfies the following condition:

$$0.82 < fs/f3 < 1.10$$

wherein f3 designates the focal length of said third lens group.

8. The zoom lens system according to claim 1, satisfies the following condition:

$$0.45 < fs/f4 < 0.56$$

wherein f4 designates the focal length of said fourth lens group.

9. The zoom lens system according to claim 1, wherein upon zooming, said first lens group and said second lens group are moved through a screw mechanism.

* * * * *